United States Patent [19]

Chiku et al.

[11] Patent Number: 4,937,664
[45] Date of Patent: Jun. 26, 1990

[54] IMAGE FORMING APPARATUS

[75] Inventors: Kazuyoshi Chiku, Tokyo; Tomohiro Aoki, Yokohama; Yasushi Murayama, Tokyo; Yoshihiko Hirose; Takashi Uchida, both of Yokohama; Kunihiko Matsuzawa, Kawasaki; Kazunori Kanekura, Yokohama, all of Japan

[73] Assignee: Canon Kabushiki Kaisha, Tokyo, Japan

[21] Appl. No.: 274,982

[22] Filed: Nov. 22, 1988

[30] Foreign Application Priority Data

Nov. 30, 1987 [JP] Japan .................. 62-300007

[51] Int. Cl.⁵ ............................................. H04N 1/46
[52] U.S. Cl. ...................................... 358/75; 355/327
[58] Field of Search .................. 358/75; 346/160; 355/327

[56] References Cited

U.S. PATENT DOCUMENTS

| 4,660,077 | 4/1987 | Kawamura | 358/75 |
| 4,734,788 | 3/1988 | Emmett | 355/327 |
| 4,752,804 | 6/1988 | Ohno | 355/327 |
| 4,816,844 | 3/1989 | Uchida et al. | 346/160 |

FOREIGN PATENT DOCUMENTS

| 023074 | 2/1983 | Japan . |
| 095362 | 6/1983 | Japan . |
| 154856 | 9/1983 | Japan . |
| 207021 | 12/1983 | Japan . |
| 031976 | 2/1984 | Japan . |
| 042879 | 3/1984 | Japan . |
| 046659 | 3/1984 | Japan . |
| 050460 | 3/1984 | Japan . |

Primary Examiner—Howard W. Britton
Attorney, Agent, or Firm—Fitzpatrick Cella Harper & Scinto

[57] ABSTRACT

An image forming apparatus has a plurality of image forming stations capable of forming different images which are to be correctly registered and superimposed. Elimination of possible image misregistration in each image station is executed on the basis of the result of detection of register marks which are formed by each image forming station. The correction is executed at a timing which is independent from image forming sequences performed by each imgae forming station in accordance with image signals, e.g., during warming-up of the apparatus after the initial application of the power immediately after the input of image forming operation start instruction through a start key, or after completion of production of a predetermined number of copies counted from the last misregistration correcting operation.

34 Claims, 16 Drawing Sheets

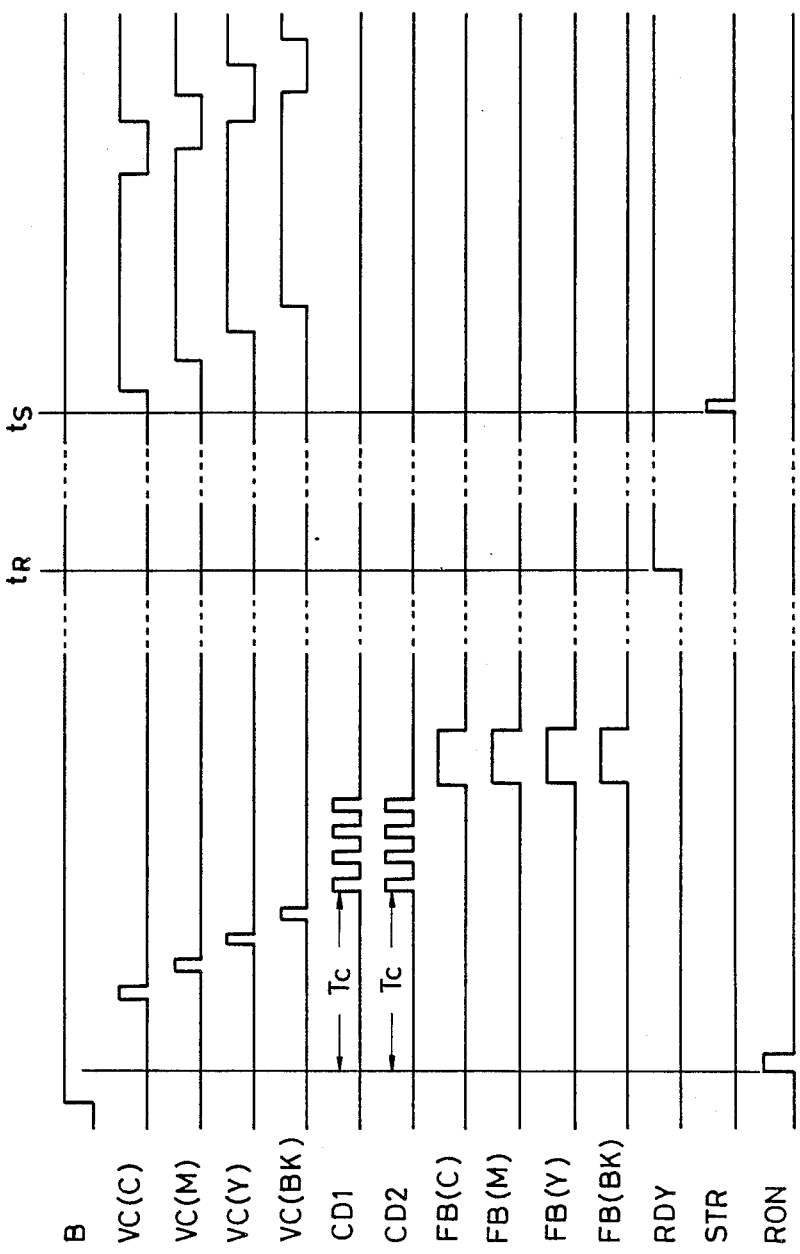

IMAGE FORMING APPARATUS

BACKGROUND OF THE INVENTION

1. Field of the Invention

The present invention relates to an image forming apparatus for forming images on a transfer material, and specifically relates to an image forming apparatus for forming superimposed images.

2. Related Background Art

The applicant of the present invention has proposed a number of color image forming apparatuses for obtaining a full color image by arranging a plurality of image holding devices (photo-sensitive drums or the like) in parallel.

Such apparatuses are described, for exmple, in Japanese Unexamined Patent Publication (Kokai) No. 58-23074 and Japanese Unexamined Patent Publication (Kokai) No. 58-95361 (corresponding to U.S. Pat. No. 4,591,903); Japanese Unexamined Patent Publication (Kokai) No. 58-95362, Japanese Unexmined Patent Publication (Kokai) No. 58-154856, Japanese Unexamined Patent Publication (Kokai) No. 58-207021, and Japanese Unexmined Patent Publication (Kokai) No. 59-31976 (corresponding to U.S. patent application No. 521,832 filed Aug. 10, 1983); and Japanese Unexamined Patent Publication (Kokai) No. 59-46659, Japanese Unexamined Patent Publication (Kokai) No. 59-50460, Japanese Unexamined Patent Publication (Kokai) No. 59-42879, all of which are incorporated herein by reference.

In an image forming apparatus of this type, an overlapping aberration (chromatic aberration) among respective colors at the time of multitransfer becomes an extremely large problem.

This problem will be explained in more detail with specific reference to FIGS. 12 to 17.

FIG. 12 schematically shows a 4-drum type full-color image forming apparatus. The apparatus has image forming stations 101C, 101M, 101Y and 101Bk for forming images of cyan, magenta, yellow and black colors, respectively. These image forming stations 101C, 101M, 101Y and 101Bk are respectively provided with photosensitive drums 102C, 102M, 102Y and 102Bk and optical scanning means 103C, 103M, 103Y and 103Bk, as well as developing units, cleaners and other parts. In operation, a transfer material or sheet S is conveyed in the direction of an arrow by a conveyor belt 112 through these image forming stations so that images of cyan, magenta, yellow and black colors are successively formed in an overlapping manner, whereby a full color image is formed on the transfer material S. The apparatus has a mark detector 111 disposed downstream from the image forming station 101Bk as viewed in the direction of movement of the transfer material, more specifically, at a point which is spaced from the center of the photosensitive drum 101Bk by a distance $l_4$. As will be seen from FIG. 12, a constant interval ($l_1=l_2=l_3$) is left between the photosensitive drums of the adjacent image forming stations.

The mark detector 111 is capable of detecting register marks which have been formed by the photosensitive drums 102C, 102M, 102Y and 102Bk of the successive image forming stations 101C, 101M, 101Y and 101Bk and transferred to the conveyor belt 112. These register marks are used as misregistration images indicative of any misregistration of images of the respective colors.

In this type of image forming apparatus having a plurality of image forming stations 101C, 101M, 101Y and 101Bk, images of the respective colors are successively formed on the same surface of the same transfer material S. Any deviation of the actual image transfer position from the designated position in each image forming station causes problems such as misregistration of the images of different colors or overlapping of the images of different colors, with the result that the quality of the reproduced image is seriously impaired due to degradation in the color or an unacceptably large misregistration.

Misregistration of color images takes place in various forms. For instance, misregistration takes place in the direction of conveyance of the transfer material indicated by an arrow A in FIG. 13(a). This misregistration is referred to as "top margin misregistration". Misregistration also takes place in the direction of scan of image indicated by an arrow B in FIG. 13(b). This type of misregistration will be referred to as "left margin misregistration". Misregistration can take place also in oblique direction, as shown in FIG. 13(c). This type of misregistration will be referred to as "oblique misregistration". FIG. 13(d) illustrates misregistration attributable to error in magnification. Thus, the misregistration of the type shown in FIG. 13(d) will be referred to as "magnification error misregistration". Usually, misregistration occurs in the form of combination of two or more of these four types of misregistration.

The top margin misregistration shown in FIG. 8(a) is mainly attributable to deviation in the time when image formation begins in the respective image forming stations 101C, 101M, 101Y and 101Bk. The left margin misregistration shown in FIG. 13(b) is usually caused by deviations in the time when writing of an image begins, i.e., deviations in the timing of start of each main scan of the image, in the respective image forming stations 101C, 101M, 101Y and 101Bk. Referring now to the oblique misregistration, this type of misregistration is chiefly attributed either to angular offset $\theta_1$ see FIGS. 14(a) to 14(c)) in the mount of scanning optical systems and angular offset $\theta_2$ (see FIGS. 15(a) to 15(c)) of the axes of the respective photosensitive drums 101C, 102M, 102Y and 102Bk. Finally, the magnification error misregistration shown in FIG. 8(d) is attributable to error $\Delta L$ in the length of the optical path between the optical scanning system and the photosensitive drum 102C, 102M, 102Y or 102Bk in each image forming station, i.e., the difference in the length of the scanning line expressed by $2\times \delta S$, as shown in FIGS. 16 and 17.

Various measures have been taken in order to eliminate these four types of misregistration. For instance, electrical adjusting means are used to electrically adjust the scan timing by a light beam so as to eliminate top margin misregistration and left margin misregistration. On the other hand, for the purpose of eliminating oblique misregistration and magnification error misregistration, means are used for adjustably mounting the optical scanning units (referred to as "scanners" hereinafter) and the photosensitive drums 102C, 102M, 102Y and 102Bk so as to allow the positions and angles of these units to be adjusted to eliminate these misregistrations. Thus, the mounting positions and the mounting angles of the scanners and photosensitive drums directly affect the oblique misregistration and magnification error misregistration, so that these misregistrations can be eliminated by adjusting the mounting positions and angles of the scanners and drums, as well as positions and angles of reflection mirrors which are disposed in the optical paths.

The top margin misregistration and the left margin misregistration may take place as temporal changes during long use of the image forming apparatus, and such temporal changes can be corrected rather easily by electrical adjusting means. However, adjustment of mounting positions and/or angles of the scanners, drums and reflection mirrors, which are adjusted for the purpose of eliminating oblique misregistration and magnification error misregistration, is very difficult. This is because a highly delicate and minute adjustment required since accurate the adjustment must be accurate down to the order of pixel size which is as small as 62 micrometers. Misregistration in the respective image forming station is caused also by other indefinite factors. For instance, misregistration may be caused by unstable running characteristics of the conveyor belt 112, e.g., winding and offsetting, reproducibility of mounting of the photosensitive drum after dismounting, and so forth. In addition, when the image forming apparatus is a laser beam printer, the top margin and left margin tend to fluctuate due to characteristics peculiar to this type of printer. It is also to be pointed out that the positional relationship between the photosensitive member and the optical system in each image forming station, which has been initially set correctly after final set-up and adjustment before installation, may be lost due to strains of structural parts of the apparatus which are liable to occur when the apparatus is moved or transported to another location. Such a change in the positional relationship, even if it is very minute, undesirably causes misregistration of color images. Readjustment for restoring the correct positional relationship is very complicated and difficult to conduct.

In an image forming apparatus which is designed to form images with a much higher resolution than ordinary electrophotographic machines, e.g., a laser beam printer which is capable of forming dots at a very small pitch such as 16 dots/mm, the misregistration of color images is caused even by a very small expansion or contraction of the structural parts of the apparatus attributable to a change in the ambient air temperature, as well as by a temporal change.

In order to obviate these problems, it has been proposed to correct any misregistration of color images formed by the respective photosensitive drums 102C, 102M, 102Y and 102Bk, by enabling a highly precise detection of color image misregistrations through detection of register marks which are formed in the respective image forming stations and transferred simultaneously with the color images to the carrier or conveyor such as a transfer belt, intermediate transfer member, rolled paper sheet, cut sheet or the like, typically a conveyor belt 112 (see FIG. 7).

The apparatus having such a correcting function, however, still encounters the following problem, due to the location of the mark detector 111 at a position which is spaced in the downstream direction by the distance $l_4$ from the axis of the most downstream photosensitive drum 102Bk. Namely, a considerably long time is required for the mark detector 111 to detect all the register marks corresponding to the photosensitive drums 102C, 102M, 102Y and 102Bk formed on the conveyor belt 112. For instance, representing the running speed of the conveyor belt 112 by P (mm/sec), a considerably long time $(l_1+l_2+l_3+l_4)/P$ seconds is required for the register mark formed by the photosensitive drum 102C to reach the mark detector 111. If the correction of misregistration has to be executed for each of successive copies, the feed of copy paper has to be done with a time interval which is not shorter than $(l_1+l_2+l_3+l_4)/P$ seconds. Thus, starting of each copying operation is seriously degraded.

If the apparatus is designed such that correction of misregistration is effected upon each detection of a register mark, particularly when the design is such that the misregistration correction and image formation are executed simultaneously, a problem is encountered in that the color images of diffrent colors formed in the successive image forming stations are partially registered and partially misregistered, so that the hue of the final color image is changed with the result that the quality of the final color image is seriously degraded.

This problem is serious particularly in the case where the misregistration is the one which is caused by deviation of the optical scanning pitch, i.e., when the misregistration is the left margin misregistration. In this case, if the correction is executed during formation of the image, distinctive regular unevenness of image density is caused in a region which is to be reproduced in a uniform halftone, resulting in a critical defect in the final image.

If the detected misregistration is the oblique misregistration or the magnification error misregistration, correction of such misregistration requires geometrical rearrangement or relocation of the constituent parts. If such a relocation is executed during the image forming operation, there is a risk that the quality of the final color image is seriously impaired because the change in the hue and the regular unevenness are multiplied by each other as a result of vibration caused by the relocation.

SUMMARY OF THE INVENTION

Accordingly, an object of the present invention is to provide an image forming apparatus which is capable of stably forming an image of a high quality, thereby overcoming the above-described problems encountered with the prior art.

Another object of the present invention is to provide an image forming apparatus which is capable of always starting an image forming sequence in a state in which image misregistration has been corrected, thereby to ensure that the reproduced image has no misregistration among images of different colors.

To this end, the present invention provides in one aspect an image forming apparatus which has correction means capable of correcting, independently of an image forming sequence in each image forming station, misregistration of image in accordance with image misregistration information concerning image misregistration at each image forming station.

In operation, when misregistration is detected, the correction means starts to effect the correcting operation at a predetermined time that is independent from the image forming sequence of each image forming station.

Still another object of the present invention is to provide an image forming appratus which is capable of correcting any image misregistration without causing the rate of operation of the apparatus to decrease.

To this end, according to another aspect of the present invention, there is provided an image forming apparatus having image forming means capable of forming an image in accordance with image signals, correction means for correcting any misregistration of an image formed by said image forming means, and control means for controlling the correction means such that the correction of misregistration of the image is executed in a period between the instant at which power is applied to the apparatus and the instant at which warm-up of the apparatus is completed.

A further object of the present invention is to provide an image forming apparatus which is capable of performing correction of any image misregistration each time a predetermined number of copies has been produced.

A still further object of the present invention is to provide an image forming apparatus which is capable of correcting any image misregistration in response to an input from input means that is capable of giving image forming sequence instructions.

These and other objects, features and advantages of the present invention will become clear from the following description of the preferred embodiments when the same is read in conjunction with the accompanying drawings.

BRIEF DESCRIPTION OF THE DRAWINGS

FIGS. 6, 8 and 10 are timing charts illustrative of image misregistration correction sequences;

DESCRIPTION OF THE PREFERRED EMBODIMENTS

Figure 1:
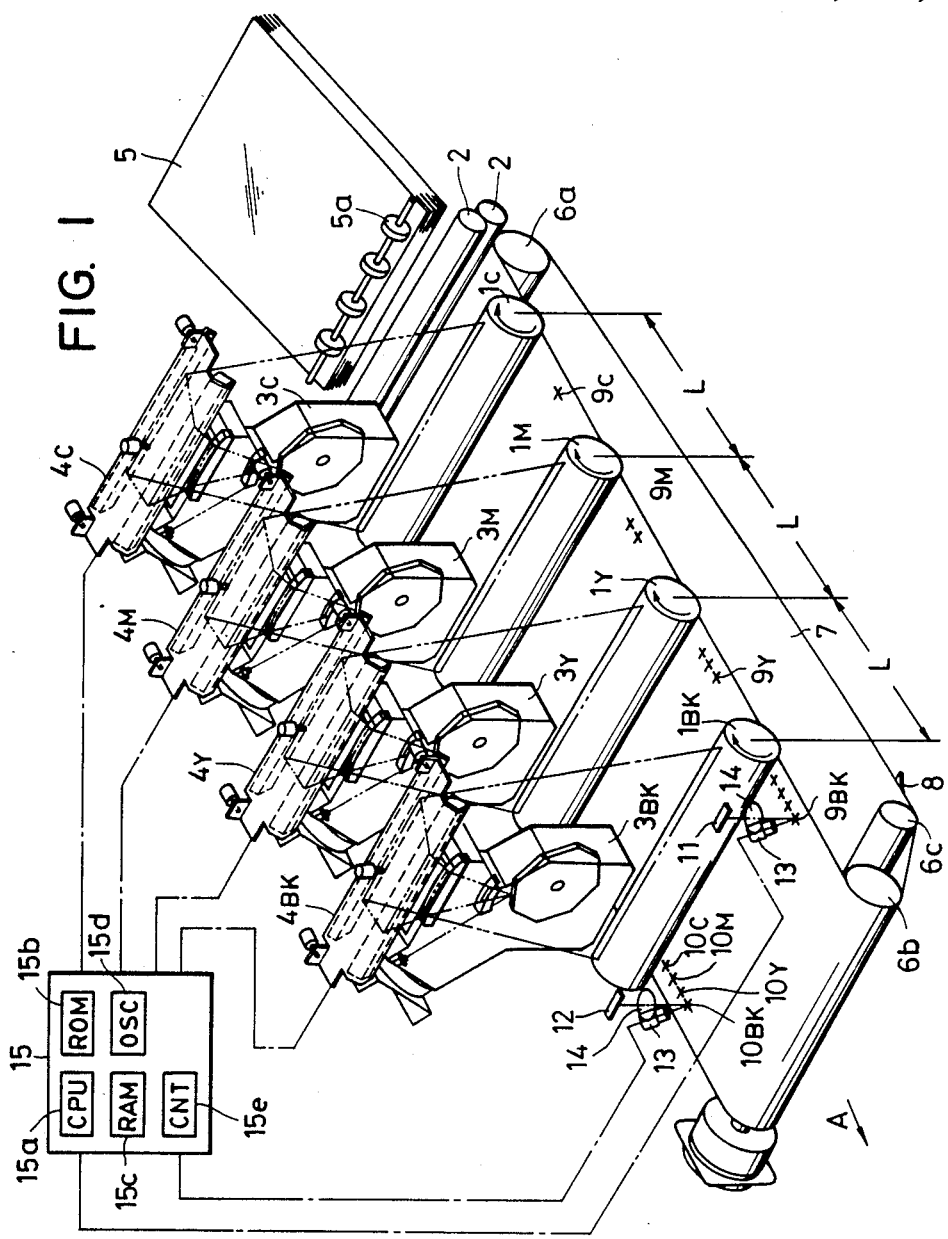
FIG. 1 is a perspective view of an embodiment of the image forming apparatus in accordance with the present invention.

FIG. 1 is a perspective view of a 4-drum type full-color image forming apparatus embodying an image forming apparatus in accordance with the present invention.

Figure 12:
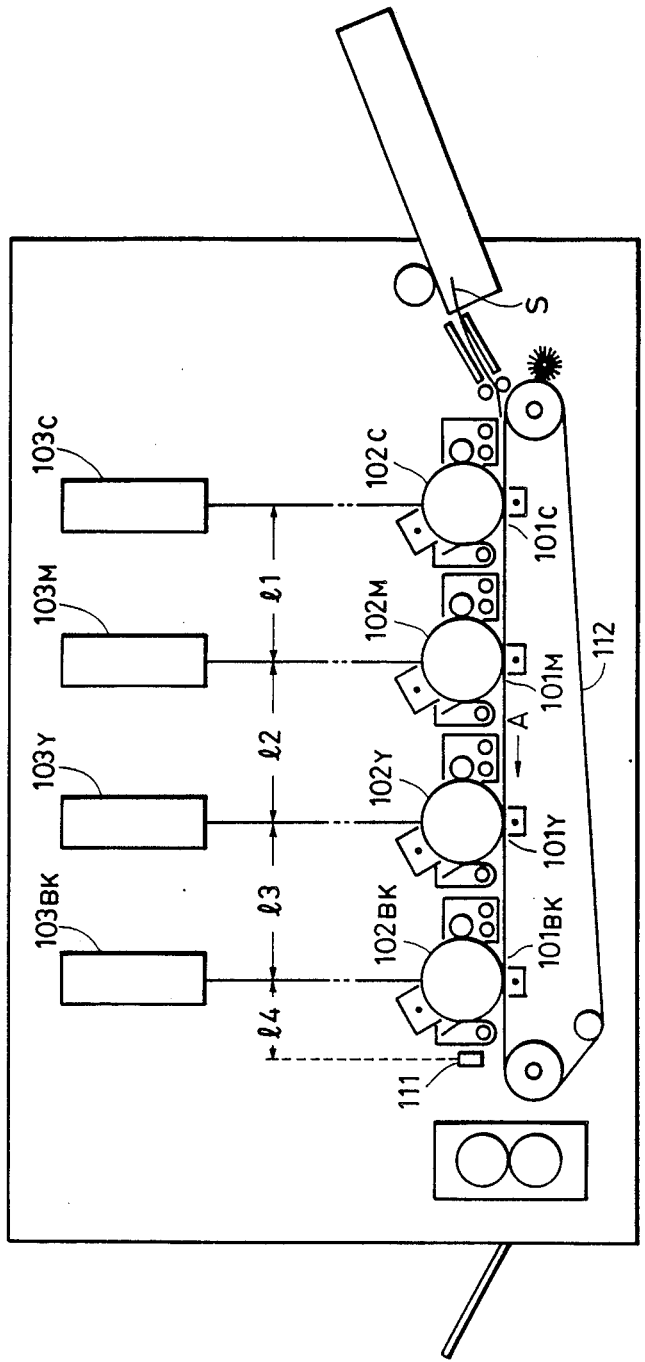
FIG. 12 is a schematic illustration of the construction of a 4-drum type full-color image forming apparatus.
Figure 13A:
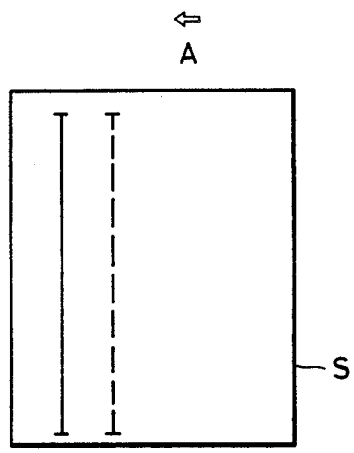
FIGS. 13(a) to 13(d) are schematic illustrations of different types of image misregistration.
Figure 13B:
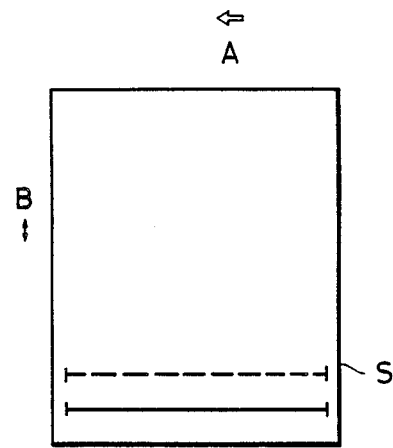
Figure 13C:
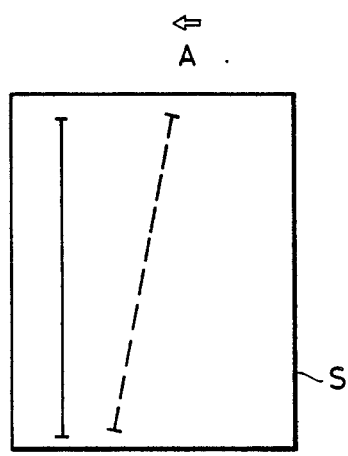
Figure 13D:
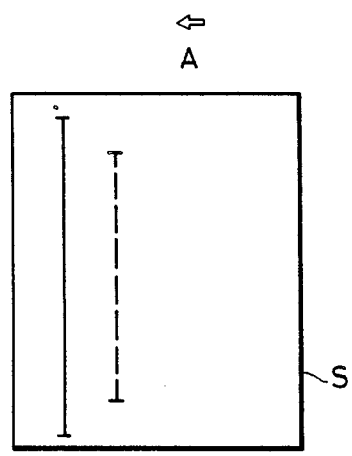
Figure 14:
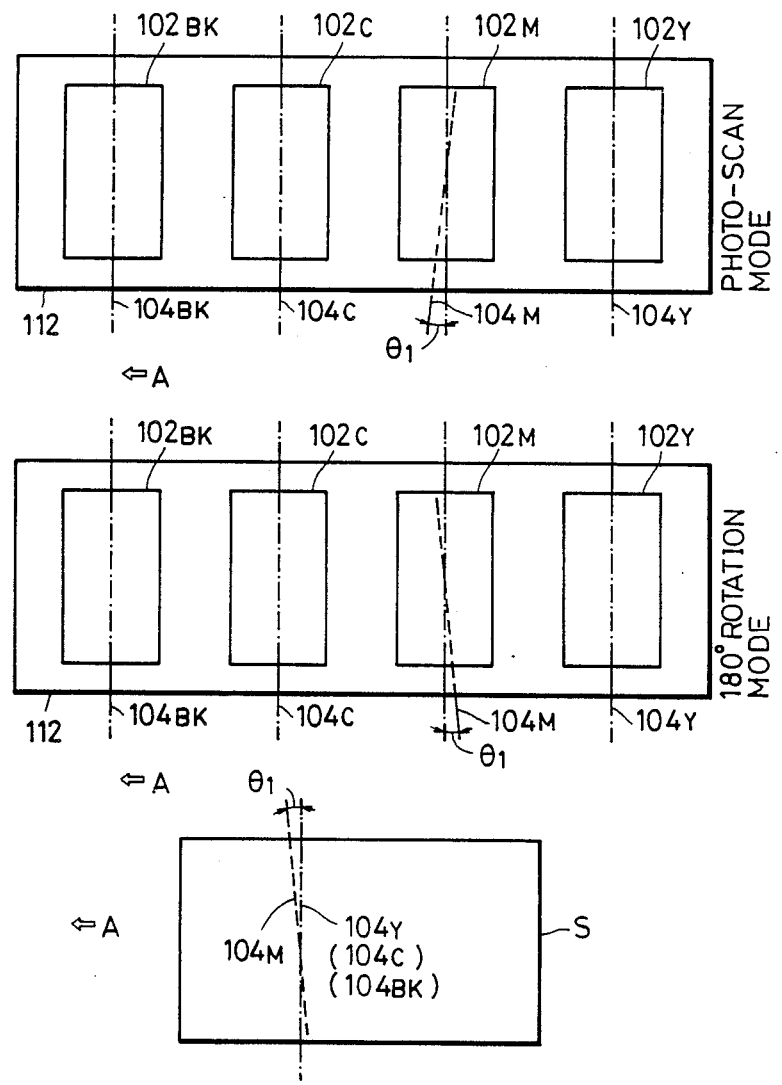
FIGS. 14(a) to 14(c) are schematic illustrations for explaining image misregistratiopn attributable to positional offset of the optical scanning system.
Figure 15:
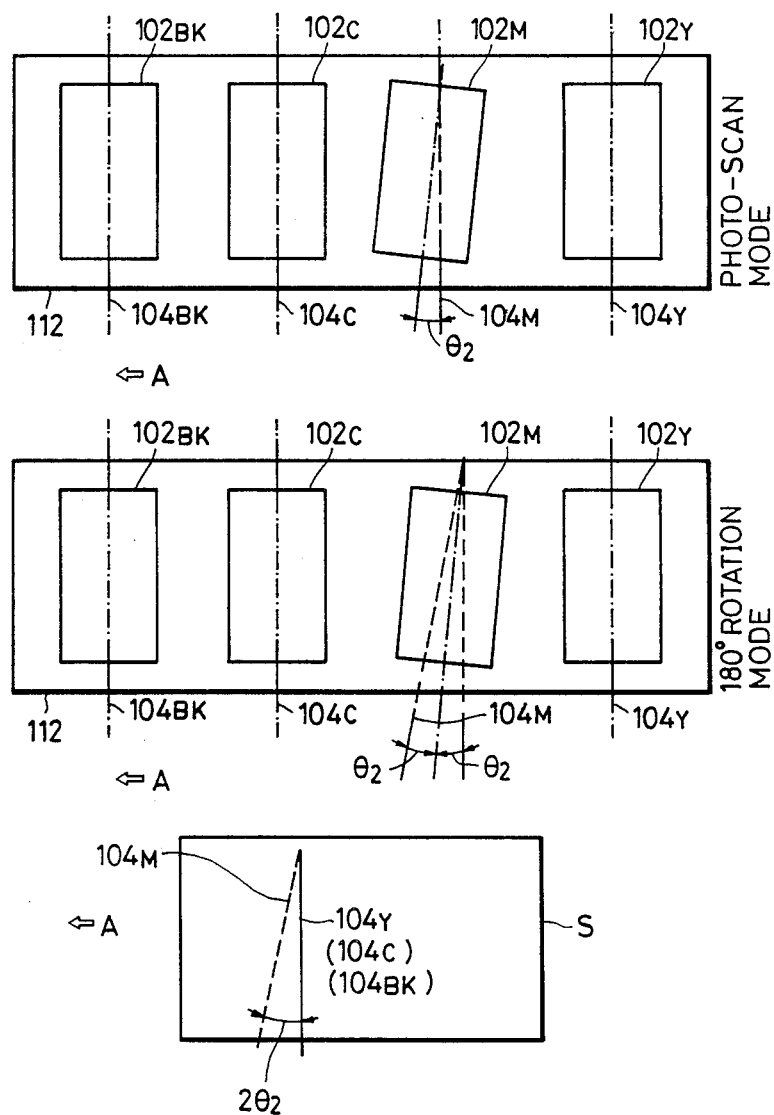
FIGS. 15(a) to 15(c) are schematic illustrations for explaining image misregistration attributable to positional offset of the axis of a photosensitive drum.
Figure 16:
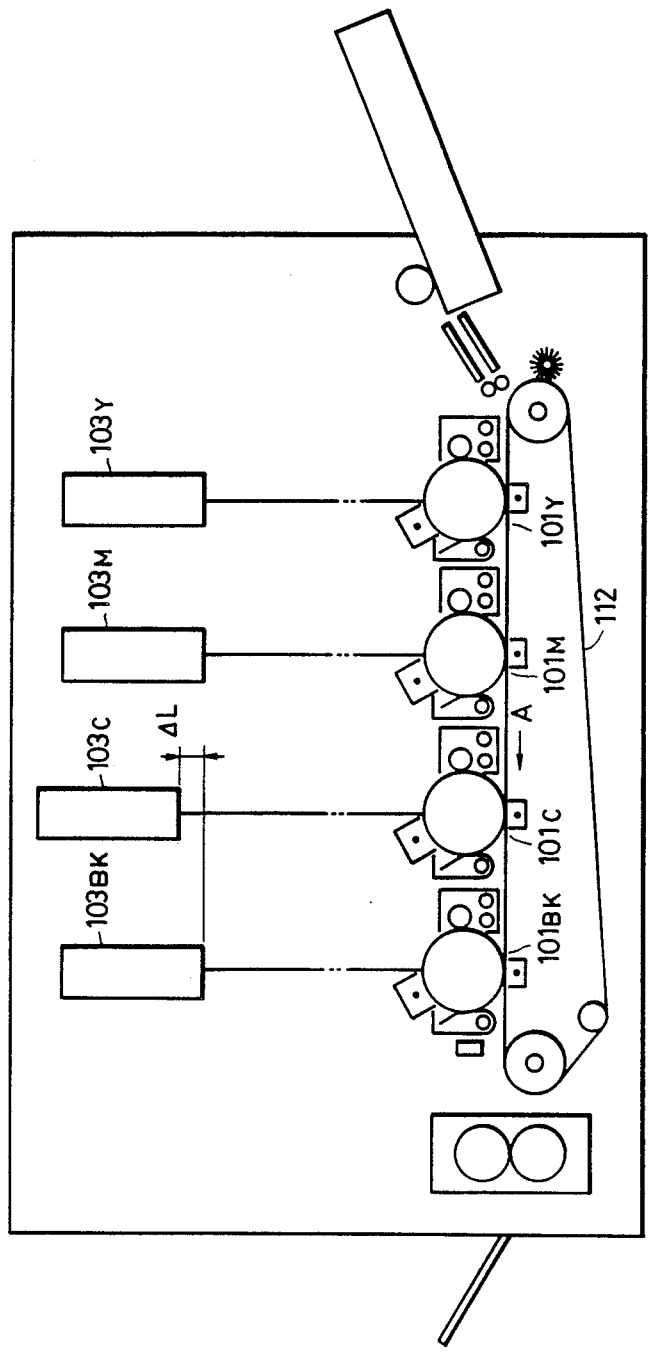
FIG. 16 is a schematic illustration for explaining image misregistration attributable to a difference in the length of an optical path.

As in the case of the known image forming apparatus explained before in connection with FIG. 12, the embodiment is so designed that color images of cyan, magenta, yellow and black colors are successively formed on the same transfer material as the transfer material passes through the respective color image forming stations, such that the color images are properly superposed, whereby a full-color image is obtained.

Referring to this Figure, the color image forming stations have respective photosensitive drums 1C, 1M, 1Y and 1Bk having toners of the respective colors: namely, cyan, magenta, yellow and black. These photosensitive drums 1C, 1M, 1Y and 1Bk are arranged to rotate in the direction of the arrows shown therein. The image forming stations have primary chargers surrounding the respective photosensitive drums 1C, 1M, 1Y and 1Bk and capable of uniformly charging these photosensitive drums, optical scanning units 3C, 3M, 3Y as image writing means (latent image forming means), developing units (not shown) for developing the latent images, cleaners, transfer chargers and so forth. Numerals 4C, 4M, 4Y and 4Bk denote, respectively, scanning mirrors which are capable of focusing beams from the optical scanning units 3C, 3M, 3Y and 3Bk on the associated photosensitive drums 1C, 1M, 1Y and 1Bk. These scanning mirrors 4C, 4M, 4Y and 4Bk are movable horizontally and vertically as viewed in the drawings by actuators which will be described later. A stack of transfer paper sheet 5 is set on one side of the apparatus. The transfer paper sheets are fed one by one into the apparatus by means of feed rollers 5a and register rollers 2. The transfer paper sheet 5 is then conveyed by an endless conveyor belt 7 which moves in an endless manner along a path presented by power-driven conveyor rollers 6a to 6c. The upper surface of conveyor belt 7 runs in the direction of an arrow A at a constant speed P (mm/sec).

The use of the conveyor belt 7, however, is only illustrative. Namely, the conveyor belt 7 may be substituted by an intermediate transfer member, a paper sheet unwound from a paper roll, cut sheet and so forth.

A series of successive register marks 9C, 9M, 9Y, 9Bk and 10C, 10M, 10Y, 10Bk is formed at opposing peripheral edges of conveyor 7 at image forming stations 1C, 1M, 1Y, 1Bk, respectively.

A cleaner 8 is capable of erasing these register mark images 9C, 9M, 9Y, 9Bk and 10C, 10M, 10Y and 10Bk which have been transferred to the conveyor belt 7. Reference numerals 11 and 12 denote mark detectors each being composed of, for example, a CCD (charge coupled device). These mark detectors 11 and 12 have a construction similar to that of an image reading sensor ordinarily used in facsimile machines, and are disposed downstream from the final image forming station as viewd in the direction of movement of the transfer paper sheet 5. The mark detectors 11 and 12 detect, at the downstream side of the final image forming stations, the successive register mark images which have been transferred to predetermined portions of the conveyor belt 7, and deliver register mark image data concerning the detected register mark images to a controller 15 which will be described later. The mark detectors include illuminating lamps 13, 13 for illuminating the register marks and lenses 14, 14 through which the register mark images are focused on the detectors 11 and 12. The controller 15 also serves as correction means for correcting any image misregistration. To this end, the controller 15 has a ROM 15b which store reference register mark image data. The controller 15 computes, on the basis of the register mark image data derived from the mark detectors 11, 12 and the reference register mark images stored beforehand, correction data necessary for correcting any positional offset, magnification error and scanning inclination in each image forming station, i.e., various types of image misregistration in each image forming station. The controller 15 further operates to deliver the computed correction data to a driver of a later-mentioned actuator so as to effect correction of the positional offset, magnification error and scanning inclination in each image forming station.

The controller 15 has, in addition to the ROM 15b which stores data necessary for computing misregistration correction date, a CPU 15a which controls the whole apparatus, a RAM 15c which is used as a work area, an oscillator 15d, a counter circuit 15e and so forth. In operation, the controller detects image misregistration in each image forming station by comparing the register mark image data of the respective colors output from the mark detectors 11, 12 with the reference register mark image data stored in the ROM 15b, and computes the position offset correction amount peculiar to each image forming station.

The controller 15 controls the timing of operation of a correcting mechanism, e.g., later-mentioned actuator, as well as timings at which operations are started for adjusting the top margin and the left margin, in such a manner that the operation for correcting the misregistration corresponding to the computed amount of position offset correction is executed at a time independent from the image forming sequence performed in any image forming station, e.g., in a period between the turning on of the power supply and the completion of warm-up of the apparatus, before commencement of image forming sequence, or when a predetermined number of image forming sequences have been completed. In particular, correcting operations including geometrical relocation of parts must be executed when the image forming stations are out of the image forming sequences.

The register mark images 9C, 9M, 9Y and 9Bk are transferred to the conveyor belt 7 such that they are arranged along and substantially in parallel with one longitudinal edge of the conveyor belt 7 at a predetermined pitch. Similarly, the register mark images 10C, 10M, 10Y and 10Bk are transferred to the conveyor belt 7 such that they are arranged along and substantially in parallel with the other longitudinal edge of the conveyor belt 7 at a predetermined pitch.

Figure 2:
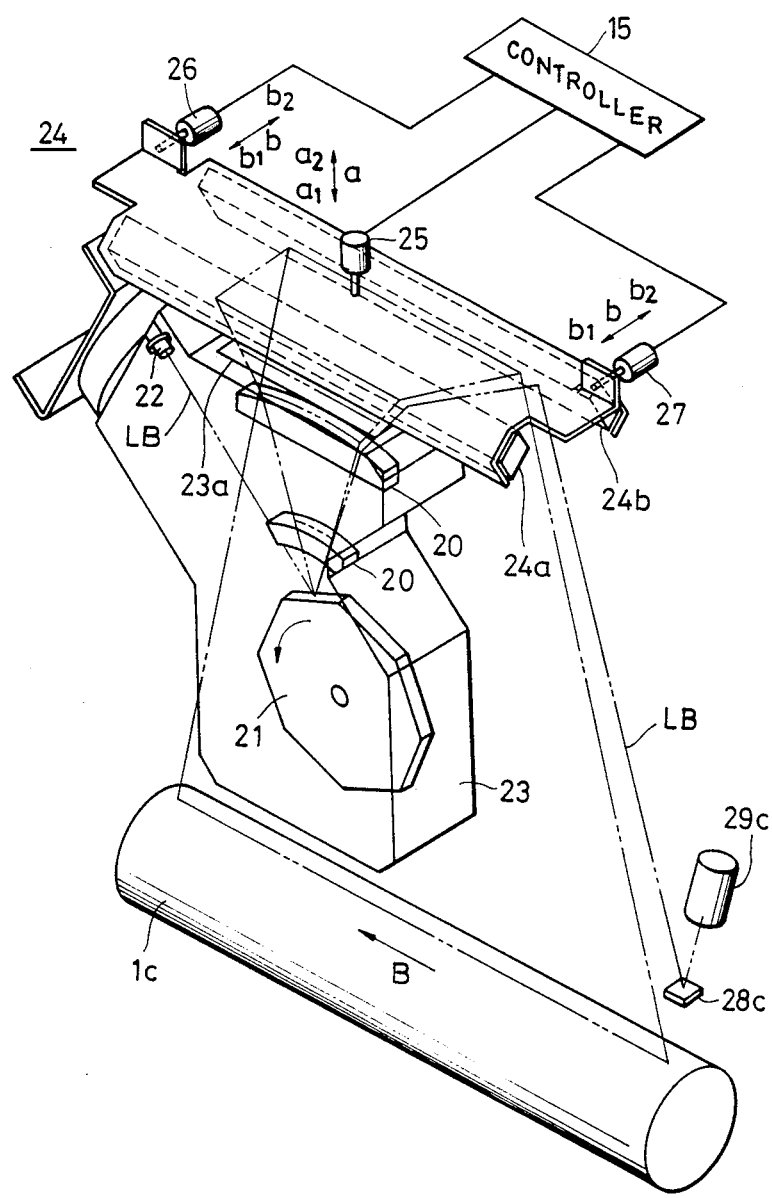
FIG. 2 is a perspective view for explaining the arrangement of a scanning mirror and an optical scanning system incorporated in the embodiment shown in FIG. 1.

FIG. 2 is a perspective view presenting details of any one of the image forming stations 1C, 1M, 1Y and 1Bk shown in FIG. 1, and particularly illustrating the positional relationship between the scanning mirror shown in FIG. 1 and the scanning unit in the resepective image forming stations. In this Figure, similar reference numerals are used to denote the same parts or members as those appearing in FIG. 1. The same arrangement is used in each image forming station, and this Figure show specifically the arrangements for the magenta, yellow, and black stations.

Referring to this Figure, a laser beam LB emitted from a laser 22 is deflected by a polygonal mirror 21 rotating at a constant angular velocity and is focused through an fθ lens 20 onto a photosensitive member such as a photosensitive drum 1C. These parts 20 to 22 are housed in an optical system housing denoted by 23.

More specifically, the laser beam LB emitted from the laser 22 and focused through the fθ lens 20 emanates through a slit 23a formed in a wall of the housing 23. The optical scanning unit further has a reflector including a first reflection mirror 24a and a second reflection mirror 24b which substantially perpendicularly faces the first reflection mirror 24a. The first reflection mirror 24a and the second reflection mirror 24b in combination provide a reflector 24 which serves as each of the scanning mirrors 4C, 4M, 4Y and 4Bk shown in FIG. 1. These parts are arranged such that the laser beam from the associated lasers 22C, 22M, 22Y or 22Bk (not shown) is focused on the photosensitive drum 1C, 1M, 1Y or 1Bk through the first reflection mirror 24a and the second reflection mirror 24b. The laser beam LB is produced in accordance with image signals which are produced by an image reader (not shown) capable of reading an original image.

The actuator mentioned before includes, although not exclusively, a linear step actuator denoted by 25. The linear step actuator 25 is capable of moving the reflector 24 composed of a unitary structure including the first and the second reflection mirrors 24a and 24b in the vertical direction as indicated by a double-headed arrow a in FIG. 2, in accordance with the number of steps output from the controller 15. The actuator also includes linear step actuators 26 and 27 which are operable independently of each other so as to move the associated ends of the reflector 24 back and forth as indicated by double-headed arrows b by an amount corresponding to the number of steps output from the controller 15.

Each of the linear step actuators 25 to 27 is a stepping motor whose shaft is moved lineary. For instance, the linear step actuator may have trapezoidal screw threads on the rotor and the output shaft as is the case of motors which are ordinarily used in driving recording/reproducing heads in floppy-disk drives. It is to be noted, however, that the actuator need not be of linear motion type. For instance, each of the linear step actuators 25 to 27 may be substituted by an ordinary rotary type stepping motor. In such a case, a lead screw thread is formed on the output shaft of the motor and a threaded member is engaged with the threaded output shaft so as to move linearly back and forth in accordance with the rotation of the output shaft. It will be understood that such an alternative actuator produces the same effect as the linear step actuator.

When the screw thread formed on the output shaft of the motor is, for example, 4P0.5 (nominal diameter 4 mm, pitch 0.5 mm) while the step angle of the stepping motor may be 48 steps/360°, the amount of feed DS per step is calculated as PS=0.5/48=10.42 um/step. Thus, the reflector 24 can be moved back and forth by amount of 10.42 um in response to each step input to the motor.

Numeral 28 denotes a scanning mirror which is capable of introducing the laser beam LB immediately before entering the image area to a beam detector 29. The beam detector 29 is adapted for generating a horizontal synchronizing signal BD which determines the timing of start of writing in the direction of main scan on the photosensitive drum 1. It is possible to adjust the left margin of the print by adjusting the timing of issue of the horizontal synchronizing signal BD.

Figure 3A:
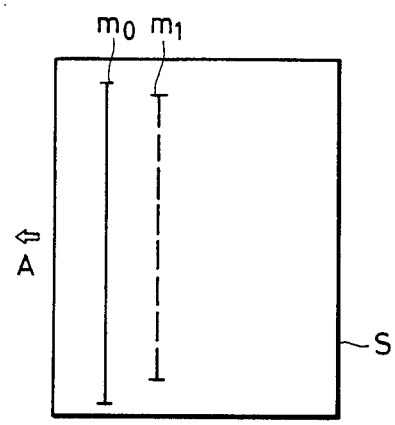
FIGS. 3(a) to 3(c) are schematic illustrations of different types of image misregistration on an image carrier.
Figure 3B:
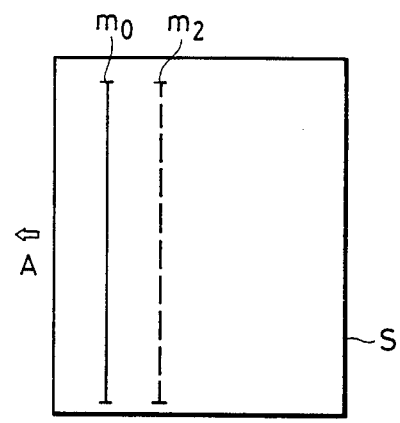

The operation of the actuators 25 to 27 of FIG. 2 will be described with reference to FIGS. 3(a) to 3(c) which show various types of image misregistration on the image carrier. Referring to these Figures, the transfer material 5 is conveyed in the direction of an arrow A, i.e., in the direction of running of the conveyor belt 7.

Assuming here that the actuator 25 is driven in the direction $a_1$ which is toward the direction of emission of the laser beam LB, the reflector 24 is moved substantially translationally in the direction a so that the length of the optical path to the photosensitive drum 1C is shortened. Conversely, the length of the optical path is increased when the actuator 25 is driven in the direction $a_2$. Since the laser beam LB has a predetermined angle of divergence, it is possible to vary the length of the scanning by the laser beam LB on the photosensitive drum 1 between $m_0$ (solid line) and $m_1$ (broken line) as shown in FIG. 3(a). Lines $m_0$ and $m_1$ are shown spaced a part for the sake of clarity.

It is assumed here that the actuators 26 and 27 are simultaneously driven in the same direction, e.g., in the direction $b_1$. In such a case, the reflector 24 is translationally moved in the direction b which is perpendicular to the direction $a_1$ of the movement effected by the actuator 25. In consequence, the scanning line $m_0$ is translationally moved to the position of the scanning line $m_2$ in FIG. 3(b).

Figure 3C:
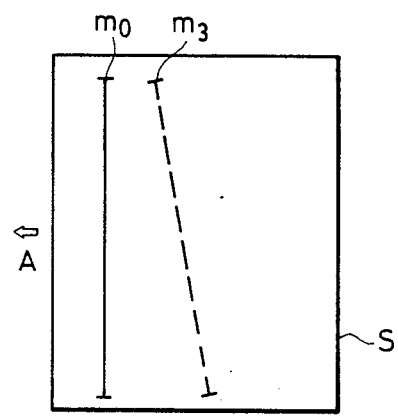

It is also possible to change the inclination of the scanning line, such as from the inclination of scanning line $m_0$ to inclination of scanning line $m_3$ in FIG. 3(c), by operating only one of the actuators 26 and 27 or by operating these actuators in opposite directions, e.g., by operating the actuator 26 in the direction $b_1$ while driving the actuator 27 in the direction $b_2$.

Thus, the described embodiment incorporates a reflector 24 which is composed of a pair of perpendicularly facing mirrors 24a and 24b and which is disposed in the path of light between the optical scanning unit and the photosensitive drum 1. With this arrangement, it is possible to adjust the length of the scanning optical path and the position of scanning by the laser beam independently of each other, by suitably controlling the position of the reflector 24 by selective operation of the actuators 25 and 26, 27. Namely, when the reflector 24 having pair of orthogonally opposing mirrors is moved in the direction a, the length of optical path for the laser beam LB can be changed without causing any change in the position of the scanning line focused on the photosensitive drum 1. On the other hand, when the reflector 24 is moved in the direction b, the position on the photosensitive drum 1 where the beam is focused and the angle of the scanning line can be varied without causing any change in the length of optical path of the laser beam LB.

In the described embodiment, each of four image forming stations in the 4-drum type full-color printer is equipped with the reflector 24 and the actuator system capable of adjusting the position of the reflector 24, as well as mirror 28 and detector 29, so that the oblique error and the magnification error misregistration attributable to inclination of the scanning line and a difference in the length of optical path, top margin misregistration and left margin misregistration are correctable for each of the successive transfer paper sheets and independently in each of the image forming stations.

A description will now be given of the process for correcting image misregistration, with specific reference to FIG. 4.

Figure 4:
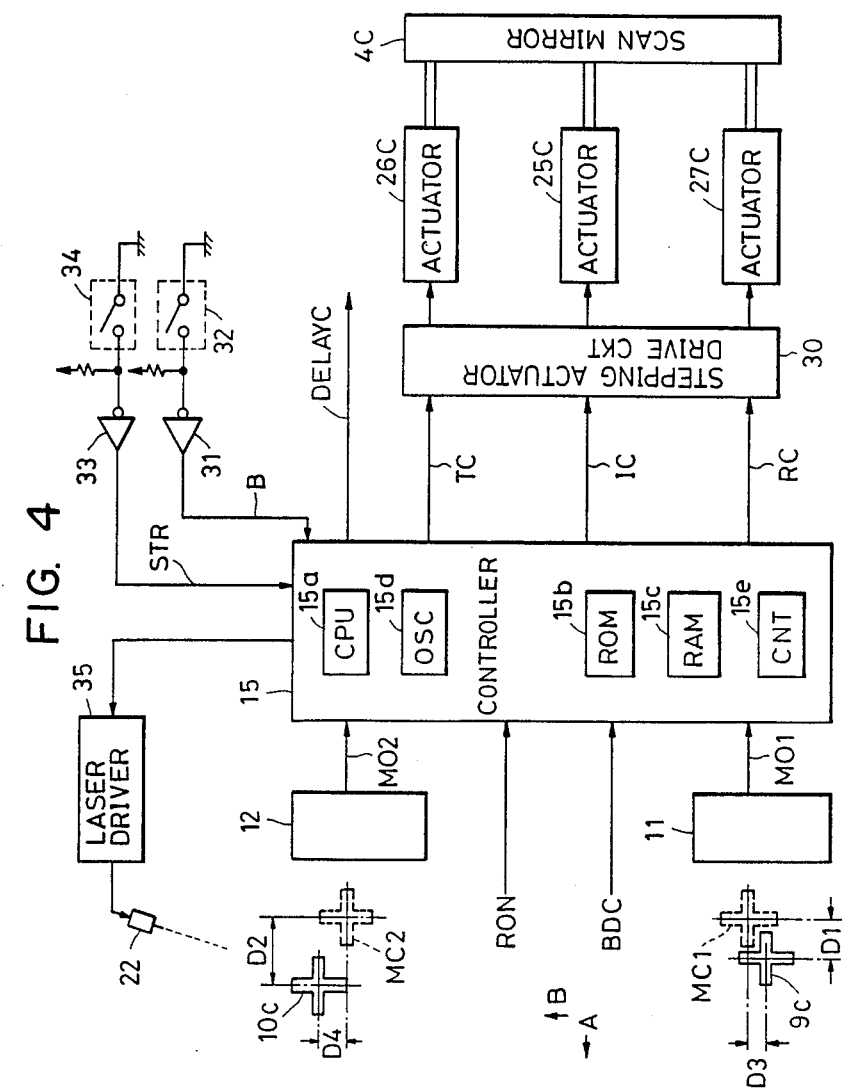
FIG. 4 is a block diagram of an embodiment of the image forming apparatus according to the present invention.

FIG. 4 is a block diagram illustrative of the process for correcting the image misregistration executed by the controller 15 explained before in connection with FIG. 1. Thus, in FIG. 4, the same reference numerals are used to denote the same parts or members as those appearing in FIG. 1. Although the following description specifically mentions the cyan image forming station, it is to be understood that the same process applies to each of the other image forming stations, i.e., the magenta, yellow and black image forming stations.

Referring to FIG. 4, a register roller start (driving) signal RON is produced when the register rollers 2, 2 shown in FIG. 1 are started. A signal BDC, which is a BD signal for the cyan color, is generated when the laser beam LB coming through the beam scanning mirror 28C is detected by the beam detector 29C. For instance, when the laser beam LB from the laser 22 of the cyan station is detected by the beam detector 29C, the beam detector 29C delivers the BD signal BDC to the controller 15, and the scanning of the photosensitive drum 1C with the laser beam LB in the direction of main scan is commenced by making use of the beam detection signal BDC as the reference.

Then, register mark image 9C and 10C are formed in accordance with a program stored in the ROM 15b of the controller 15 and the thus formed register mark image are transferred to predetermined regions of the conveyor belt 7 which is running at a constant speed in accordance with the register roller driving signal RON. The transferred register mark images 9C and 10C are moved in the direction of the arrow A so as to reach and be read by the mark detectors 11 and 12 which are disposed downstream of the final image forming station 1Bk. The controller 15 beforehand stores the cyan register mark image data which are to be used as reference. These data correspond to broken-line reference marks MC1 and MC2 shown in FIG. 4.

The register mark images have, for example, cross-like form. The controller 15 has a cyan image memory which is designed for storing the register mark image data concerning the register mark images 9C and 10C which are read by the mark detectors 11 and 12. The storage of the register mark image data is executed under the control of the controller 15 in synchronization with predetermined reference clock signals from the moment at which the register roller driving signal RON is issued. The controller then determines the position of the central pixel of the data in the direction A of the main scan and the central pixel of the data in the direction B of sub-scan. The controller then determines the amounts D1 and D2 of difference between the positions of the central pixels and the positions of the central pixels of the reference marks MC1 and MC2 in the direction of main scan in terms of numbers of pixels, as well as the amounts D3 and D4 of the difference between the positions of the central pixels of the reference marks MC1 and MC2 in the direction of the sub-scan in terms of number of pixels.

In consequence, the controller 15 recognizes that there is an offset of left margin, i.e., left margin misregistration, in amount of D3 in terms of number of pixels and an offset of the top margin, i.e., top margin misregistration, in amount of D1 in terms of the number of pixels. The controller 15 further recognizes the degree of inclination of the scan line as the difference (D2−D1) between the amouts D2 and D1 of offset of the respective central pixels of the register image data from the central pixels of the associated reference marks as well as the magnification error as the difference (D4−D3) between the amounts D4 and D3 of offset of the central pixels of the respective register mark images from the central pixels of the associated reference marks.

The offset amounts D1, D3 and the difference values (D2−D1) and (D4−D3) are stored in the RAM 15C and are used in the adjustment of the left margin for the actual image forming operation. More specifically, a left margin control output for cyan (DELAYC) is issued in such a manner as to negate or cancel the offset amount D3 after the receipt of the BD signal BDC so that the timing of writing of image in accordance with the cyan image data stored in the image memory is delayed after the detection of the laser beam LB by the beam detector 29 so as to set the left margin at a predetermined position, thus effecting correction of left margin misregistration.

On the other hand, the correction of the top margin misregistration is effected by operating the actuators 26C and 27C in accordance with the amount D1 thereby to set the top margin on the position of the central pixel of the reference mark MC1. This can be conducted by delivering, to the stepping motor actuator drive circuit 30C, a top margin control signal for cyan (TC) which corresponds to the number of the steps necessary for cancelling the offset amount D1 of the central pixel. As a result, the actuators 26C and 27C are operated back and forth by an equal amount so that the scanning mirror 4C is moved translationally thereby correcting the position of the top margin.

Correction for the inclination of scanning line is executed in the following manner. Namely, the controller 15 functions to operate the actuators 26C and 27C in accordance with the difference value (D2−D1) so as to set the scanning line in alignment with a predetermined axis line. This can be executed by delivering, to the stepping motor actuator drive circuit 30C, an inclination control output for cyan (IC) which corresponds to the number of steps necessary for negating or cancelling the difference value (D2−D1). In consequence, the actuators 26C and 27C operate in the horizontal direction in different amounts so as to change the posture of the scanning mirror 4C thereby to eliminate any inclination of the scanning line.

The magnification error misregistration can be corrected by operating the actuator 25C in accordance with the difference amount (D4−D3) so as to make the image magnification value. This can be executed by delivering, to the stepping motor actuator drive circuit 30C, a magnification control ouput from cyan (RC) which corresponds to the number of steps necessary for cancelling the difference value (D4−D3). As a result, the actuator 25C operates to move the scanning mirror 4C up and down, thereby adjusting the length of the optical path leading from the laser 22 so as to correct the misregistration attributable to the magnification error.

The operation of the arrangement shown in FIG. 4 will be described with reference to the timing chart shown in FIG. 5.

Figure 5:
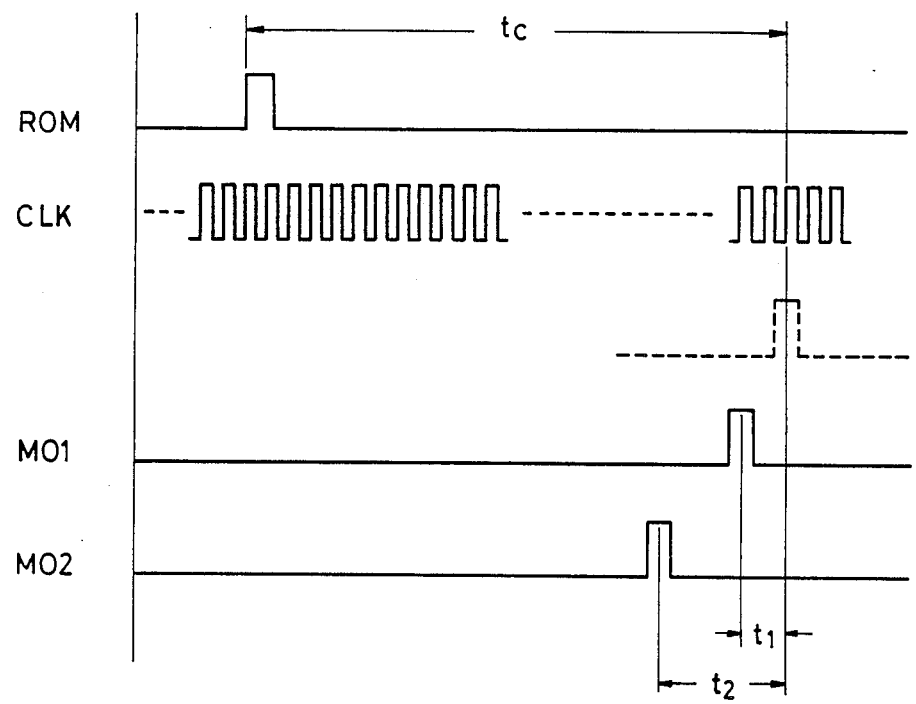
FIG. 5 is a timing chart illustrative of a detecting operation for detecting a register mark.
Figure 17:
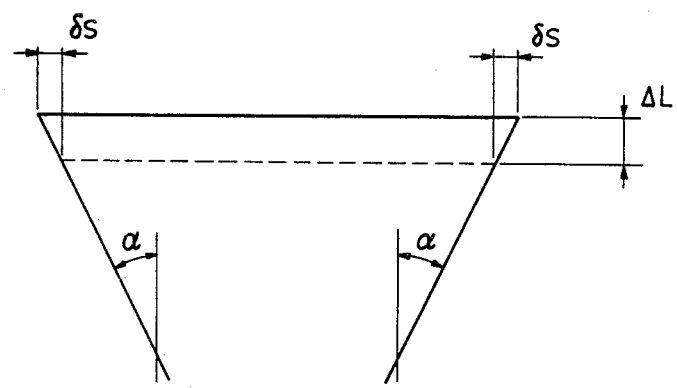
FIG. 17 is a schematic illustration for explaining image misregistration attributable to a magnification error.

Referring to FIG. 5, counting of reference clock signals CLK produced by the oscillator 15d is commenced in synchronization with the register roller start (driving) signal RON. A period $t_c$ is for detection of the register marks for cyan color and corresponds to the time length required for the counter circuit 15e to count the reference clock signals CLK after the issuance of registr roller start signal RON. Thus, the fact that the mark detectors 11 and 12 detect the register mark images 9C and 10C after the expiration of the detection period $t_c$ means that there is ni image misregistration in regard to the cyan color. Thus, the detection period $t_c$ corresponds to the time between the instant at which the register roller start signal RON is issued until the instant at which the reference marks MC1 and MC2 shown in FIG. 4 are detected. A mark detection output MO1 is produced when the mark detector 11 has read the register mark image 9C, while mark detection output MO2 is produced when the register mark image 10C is read by the mark register 12.

As will be understood from this Figure, any image misregistration taking place, for instance, in the cyan image forming station having the photosensitive drum 1C, the mark detectors cannot detect imaginary reference marks MC1 and MC2 shown in FIG. 4 when the detection period $t_c$ has expired after the issue of the register roller start signal RON, and the timings at which the mark detectors 11 and 12 detect the register mark images 9C and 10C fluctuate as shown in FIG. 5. The controller 15 thertefore computes the central pixel offset amounts D1 and D2 from the time lengths $t_1$ and $t_2$ shown in FIG. 4, and produces a correction control signal for correcting the image misregistration, e.g., the topmargin control signal TC in accordance with the thus computed central pixel offset amounts D1 and D2. The controller 15 then deliers this correction signal to the stepping motor actuator drive circuit 30C so that the top margin is set at the correct position.

Numeral 32 in FIG. 4 denotes a power supply switch for supplying electrical power to the apparatus, while 31 denotes an inverter which delivers a later-mentioned signal B. The inverter operates such that the leel of the signal B is set to H (High) level when the power supply switch 32 is turned on. Numeral 34 denotes a start key for giving instruction for starting the image forming operation. An inverter 33 is designed to set a later-mentioned signal STR to H level when the start key 34 is turned on. A laser driver 35 is capable of controlling the laser 22 which emits the laser beam.

Various controls for starting correcting operations performed in this embodiment will be described with reference to FIGS. 4 to 13.

(First Correction Control Process)

FIG. 4 is a timing chart explanatory of a first correction control process performed by the apparatus of this embodiment. The signal B set at H level indicates that the power supply switch 32 in FIG. 4 has been turned on. A symbol VC(C) represents a cyan image writing signal. The laser driver 35 is operated in synchronization with the rise of the image writing signal VC(C) so that register mark images 9C and 10C are written on the photosensitive drum 1C and the thus written register mark images are transferred to the conveyor belt 7 when a predetermined time has passed after they are written on the photosensitive drum 1C. Similarly, magenta register mark images 9M and 10M are written on the photosensitive drum 1M in synchronization with the rise of an image writing signal VC(M). The images 9M and 10M are transferred to the conveyor belt 7 after elapse of a predetermined time. Similarly, yellow register mark images 9Y and 10Y are written on the photosensitive drum 1Y in synchronization with the rise of a yellow image writing signal VC(Y). The images 9Y and 10Y are transferred to the conveyor belt 7 after elapse of a predetermined time. Finally, black register mark images 9Bk and 10Bk are written on the photosensitive drum 1Bk in synchronization with the rise of a black image writing signal VC(Bk). The images 9Bk and 10Bk are transferred to the conveyor belt 7 after elapse of a predetermined time. Upon detection of the register mark image 9C after elapse of a time $T_C$ from the issue of the register roller drive signal RON, the mark detector 11 produces a mark detection output signal CD1. Similarly, the register marks 9M, 9Y and 9Bk are sequentially detected at timings $t_m$, $t_y$ and $t_{Bk}$ which are not shown. Symbol CD2 represents a mark detection output produced by the detector 12. The detector 12 successively detects the register mark images 10C, 10M, 10Y and 10Bk.

The controller 15 delivers to the actuators 25C, 26C and 27C (see FIGS. 2 and 4) aforementioned correction control signals TC, IC and RC in synchronization with the rise of a feedback timing signal FB(C) which indicates the timing of feedback control for commencing the correction. At the same time, the controller adjusts the vertical and horizontal synchronization for determining the left margin and top margin. The correction process is completed when the feedback timing signal FB(C) falls.

Similarly, the controller 15 delivers correction control signals to the actuators associated with the magenta photosensitive drum 1M (see FIGS. 2 and 4) in synchronization with the rise of a feedback timing signal FB(M) which indicates the timing of feedback control for commencing the correction. At the same time, the controller adjusts the vertical and horizontal synchronization for determining the left margin and top margin. The correction process is completed when the feedback timing signal FB(M) falls.

Similarly, the controller 15 delivers correction control signals to the actuators associated with the yellow photosensitive drum 1Y of FIG. 2 in synchronization with the rise of a feedback timing signal FB(Y) which indicates the timing of feedback control for commencing the correction. At the same time, the controller adjusts the vertical and horizontal synchronization for determining the left margin and top margin. The correction process is completed when the feedback timing signal FB(Y) falls.

Finally, the controller 15 delivers correction control signals to the actuators associated with the black photosensitive drum 1Bk (see FIGS. 2 and 4) in synchronization with the rise of a feedback timing signal FB(Bk) which indicates the timing of feedback control for commencing the correction. At the same time, the controller adjusts the vertical and horizontal synchronization for determining the left margin and top margin. The correction process is completed when the feedback timing signal FB(Bk) falls.

An operation ready signal RDY indicates that the warm-up of the apparatus is finished. An ordinary image forming sequence is commenced at the instant $t_s$ at which the print start signal STR is set to H level by pressing of the start key 34 after the completion of the warm-up of the apparatus.

Figure 7:
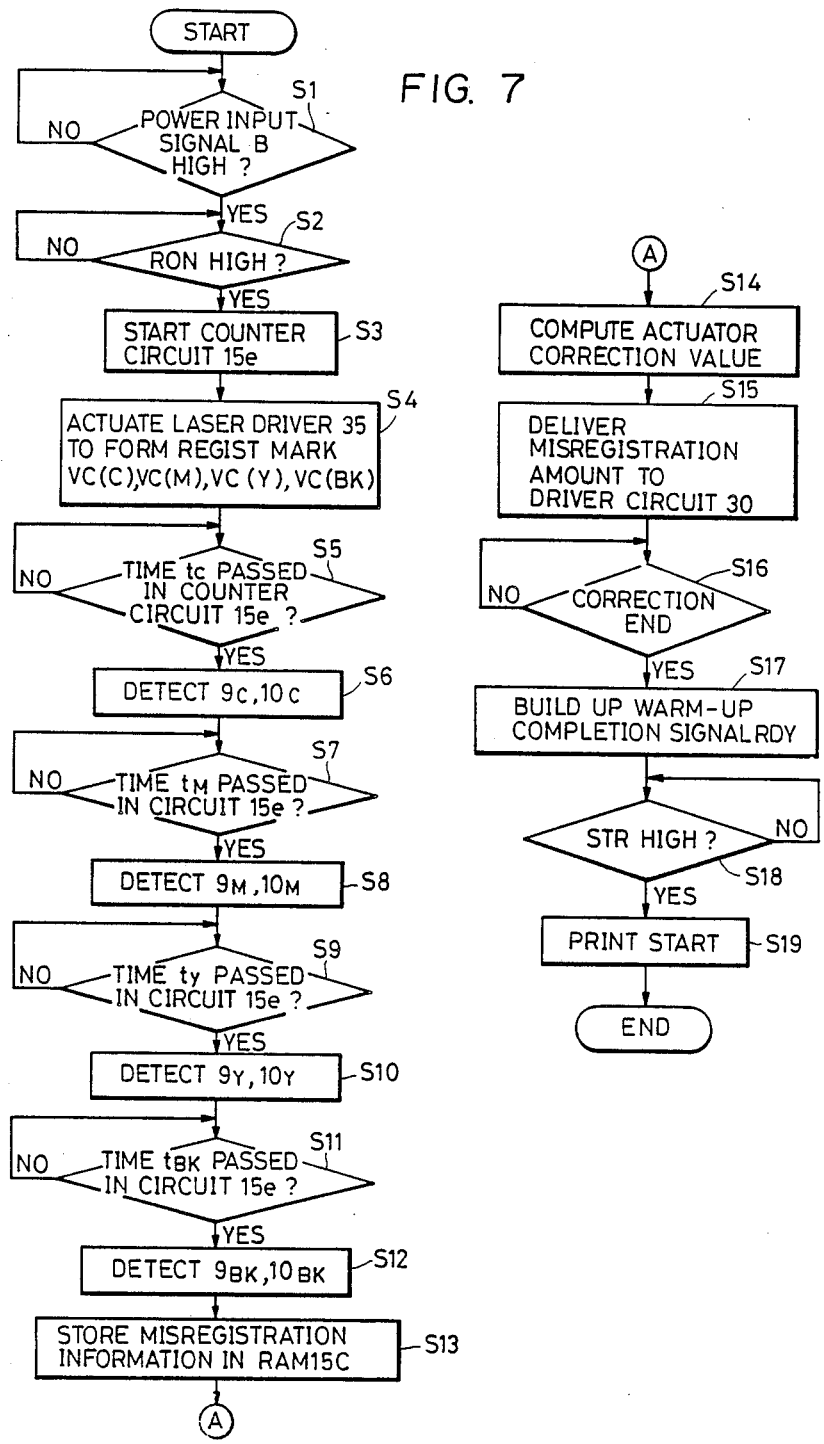
FIGS. 7, 9 and 11 are flow charts for explaining operational steps corresponding to the sequences shown in FIGS. 6, 8 and 10.

FIG. 7 is a flow chart illustrating the operation described in connection with FIG. 6. This flow is stored in the ROM 15b and is executed under the control of the CPU 15a.

FIG. 7 is a flow chart illustrating the operation described in connection with FIG. 6. This flow is stored in the ROM 15b and is executed under the control of the CPU 15a.

Step S1 determines whether the power supply input signal B has been set to H level. The process proceeds to Step 32 if the power supply switch 32 has been turned on. Step 32 judges whether the register roller drive signal has been set to H level. If the answer is YES, the process proceeds to Step S3 in which the counter circuit 15e is started so as to commence counting of the clock signals from the oscillator 15d. In Step S4, the image writing signal VC(C) for forming the register mark is set to H level so that the laser driver 35 is started. Similarly, image writing signals VC(M), VC(Y) and VC(Bk) are successively set to H level so that register mark images 9C, 10C, 9M, 19M, 9Y, 10Y, 9Bk and 10Bk are independently formed on predetermined portions of the photosensitive drums 1C, 1M, 1Y and 1Bk of the respective image forming stations in synchronization with the image writing signals VC(C), VC(M), VC(Y) and VC(Bk). After elapse of a predetermined time, these register mark images are transferred to the conveyor belt 7 which is running at a constant speed.

Step S5 judges whether the value counted by the counter circuit 15e, which has started in synchronization with the start of the register rollers 2, 2, has exceeded a value which corresponds to the timing to at which the register mark images 9C and 10C are expected to be detected. If this value is exceeded, i.e., when the time $t_c$ has elapsed, the process proceeds to Step S6 in which register mark images 9C and 10C are detected by the mark detectors 11 and 12. Similarly, in Steps S7 to S12, register mark images formed in the respective image forming stations are detected at the respective timings. In Step S13, data concerning the register marks detected in Steps S5 to S12 are stored in the RAM 15c. In Step S14, misregistration correction amounts are computed for the respective image forming sections. In Step S15, the thus computed misregistration correction amounts, e.g., the signals TC, IC and RC in the case of the cyan image forming section, are delivered to the driver circuit 30C.

In response to these signals representing the correction amounts, the misregistration is corrected in each image forming station, in accordance with the correction feedback signals FB(C), FB(M), FB(Y) and FB(Bk). More specifically, in each image forming section, correction control signals are delivered to the actuators in concert with the correction feedback signals so as to move the scanning mirror or reflector vertically and horizontally thereby to eliminate any top margin misregistration, oblique misregistration attributable to inclination of scanning line and magnification error misregistration.

Step S16 judges whether the misregistration correction is finished. If the correction has been finished, the process proceeds to Step S17 in which the warm-up completion signal RDY is set to H level, thus confirming completion of the warm-up of the apparatus.

Then, ordinary image forming sequence is started when the print start signal STR is set to H level as a result of start input through the start key 34, in Steps S18 and S19. In Step S19, the timing of delivery of the image signal is controlled in accordance with the magnification data DELAYC, DELAYM, DELAYY, DELAYBK stored in the ram 15c so as to correct any left margin misregistration. Thus, according to the first correction control process, the image registration in all the image forming stations are corrected until the warm-up of the apparatus is completed. In consequence, image misregistration of various types, which have taken place before the power is turned for various reasons such as a change in the environmental condition can be collectively corrected. This ensures that the copy which is obtained for the first time after the start of the apparatus has a high quality of reproduced image which contains no image misregistration.

It is also to be noted that the first correction control process is advantageous in that the correction of image misregistration is completed during warming up the apparatus, so that it is not necessary to set a special sequence time for the correction of the image misregistration. This contributes to an improvement in the rate of operation of the apparatus.

When one or more of the photosensitive drums 1C, 1M, 1Y and 1Bk have been renewed after the preceding image forming operation, there is a risk that the new drum or drums may have been set such that their generating lines are inclined from the correct direction of generating line. This, however, does not cause any trouble because the correcting operation for eliminating any undesirable effects of such mounting error is automatically executed before the next image forming operation is started. Thus, the user is relieved from troublesome maintenance work which otherwise would be necessitated to eliminate such undesirable effect.

(Second Correction Control Process)

Figure 8:
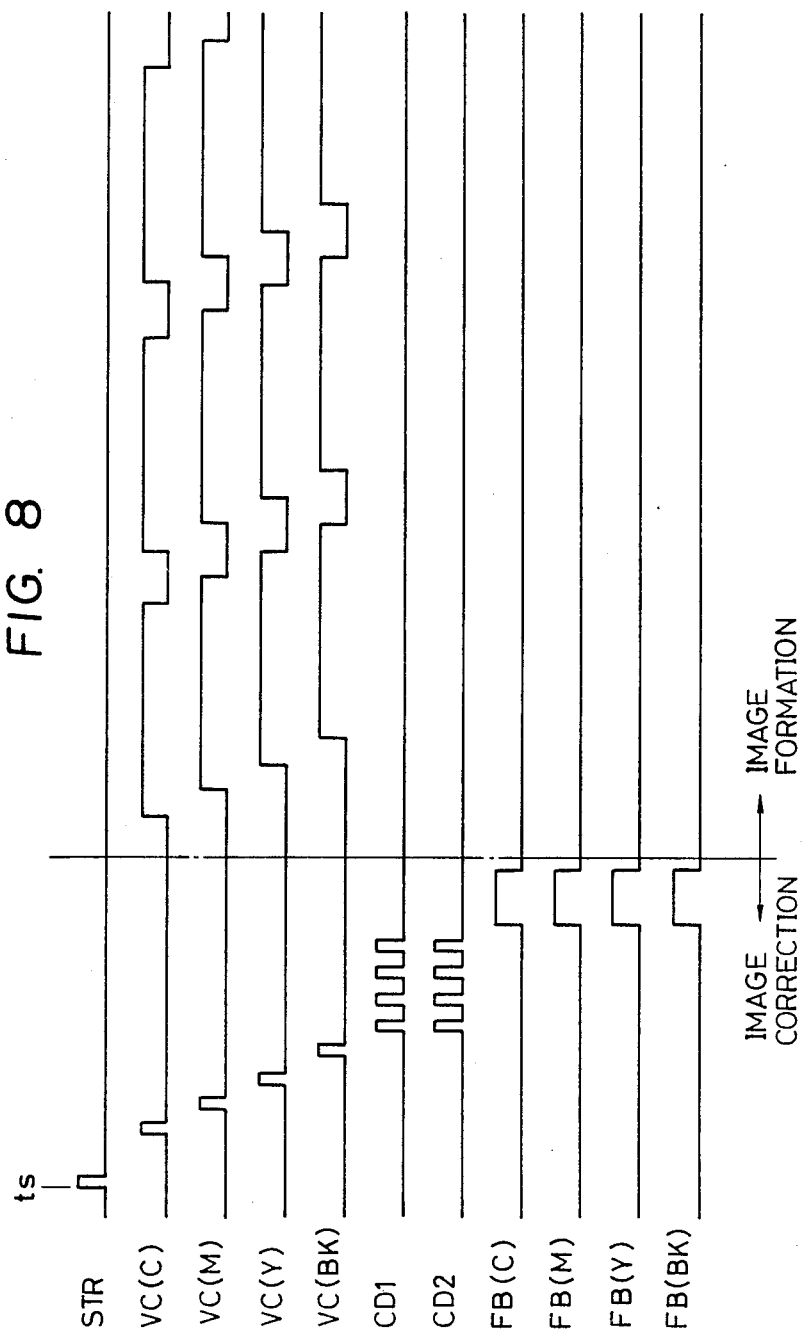

FIG. 8 is a timing chart illustrating the second correction control process in accordance with the present invention. In this Figure, the same reference numerals are used to denote the same things as those in FIG. 6.

Figure 9:
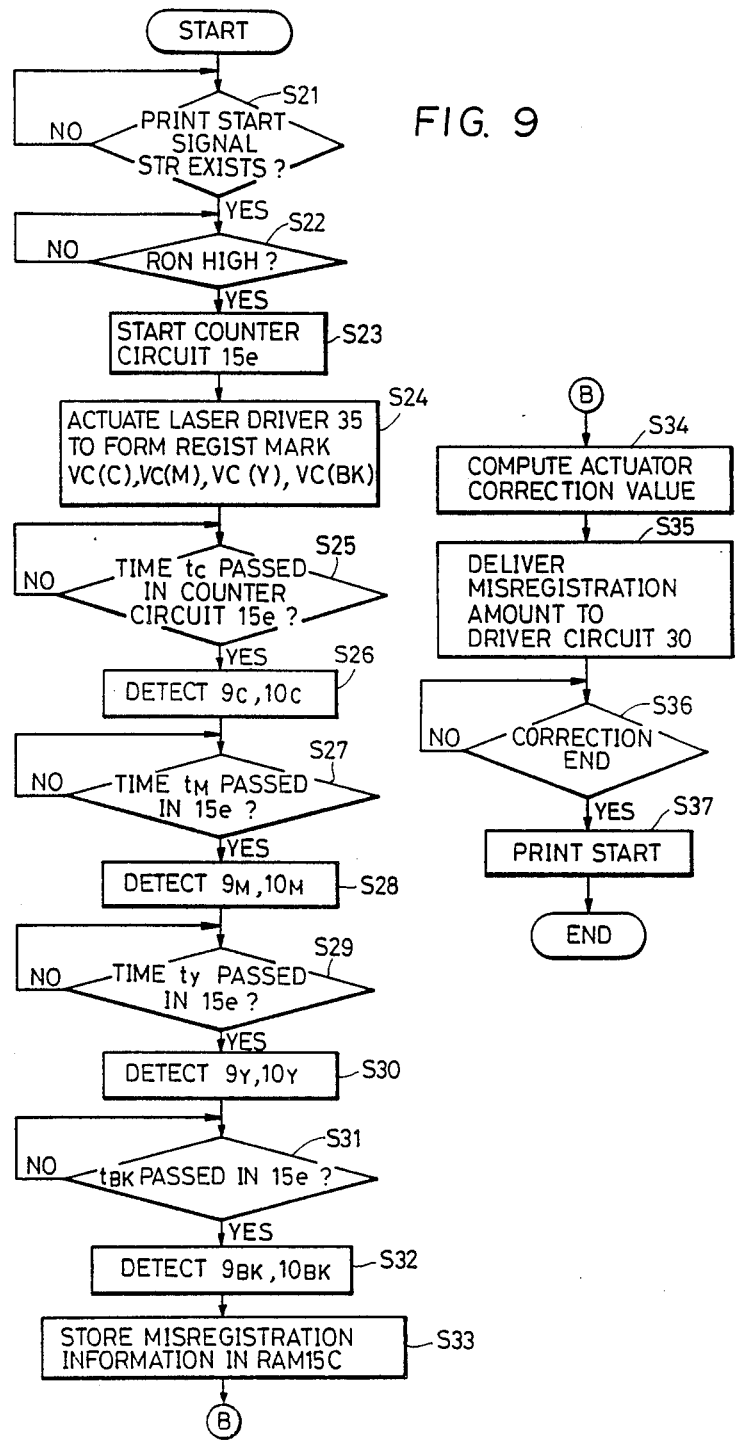

As will be seen from this Figure, in the second correction control process, image misregistration correcting sequence is forcibly executed after the print start signal STR is set high as a result of actuating start key 34. The correcting operation itself is the same as that in the first correction control process. The second correction control process is illustrated in FIG. 9.

Step S21 judges whether the print start signal STR has been set high (H). The process proceeds to Step S22 if the start key 34 has been turned on. Step S22 judges whether the register roller drive signal has been set to H level. If the answer is YES, the process proceeds to Step S23 in which the counter circuit 15e is started so as to commence counting of the clock signals from the oscillator 15d. In Step S24, the image writing signal VC(C) for forming the register mark is set to H level so that the laser driver 35 is started. Similarly, image writing signals VC(M), VC(Y) and VC(Bk) are successively set to H level so that register mark images 9C, 10C, 9M, 10M, 10Y, 9Bk and 10Bk are independently formed on predetermined portions of the photosensitive drums 1C, 1M, 1Y and 1Bk of the respective image forming stations in synchronization with the image writing signals VC(C), VC(M), VC(Y) and VC(Bk). After elapse of a predetermined time, these register mark images are transferred to the conveyor belt 7 which is running at a constant speed.

Step S25 judges whether the value counted by the counter circuit 15e, which has started in synchronization with the start of the register rollers 2, 2, has exceeded a value which corresponds to the timing $t_c$ at which the register mark images 9C and 10C are expected to be detected. If this value is exceeded, i.e., when the time $t_c$ has elapsed, the process proceeds to Step S26 in which register mark images 9C and 10C are detected by the mark detectors 11 and 12. Similarly, in Steps S27 to S32, register mark images formed in the respective image forming stations are detected at the respective timings. In Step S33, data concerning the register marks detected in Steps S25 to S32 are stored in the RAM 15c. In Step S34, misregistration correction amounts are computed for the respective image forming stations. In Step S35, the thus computed misregistration correction amounts, e.g., the signals TC, IC and RC in the case of the cyan image forming station, are delivered to the driver circuit 30.

In response to these signals representing the correction amounts, the misregistration is corrected in each image forming station, in accordance with the correction feedback signals FB(C), FB(M), FB(Y) and FB(Bk). More specifically, in each image forming station, correction control signals are delivered to the actuators in concert with the correction feedback signals so as to move the scanning mirror or reflector vertically and horizontally thereby to eliminate a by top margin misregistration, oblique misregistration attributable to inclination of scanning line and magnification error misregistration.

Step S36 judges whether the correction of misregistration has been finished with all image forming stations. If the answer is YES, the process proceeds to Step S37 in which ordinary image forming sequence is started. Step S37 also executes control of output of the image signal in accordance with the misregistration data DELAYC, DELAYM, DELAYY, DELAYBk stored in the RAM 15c thereby to correct any left margin misregistration.

Thus, according to the second correction control process, the image misregistration correction sequence is executed before an ordinary image sequence is started each time the print start signal STR rises. This second correction control process, in addition to the advantages brought about by the first correction control process, provides the following advantages. There is a risk that a cause of image misregistration may have occurred after completion of the preceding image forming sequence due to, for example, relocation of the whole image forming apparatus. It will be seen that the second correction control process eliminates any image misregistration attributable to such a case, so that the image forming apparatus can produce color copy images of good quality regardless of any change in the environmental or installation condition.

(Third Correction Control Process)

Figure 10:
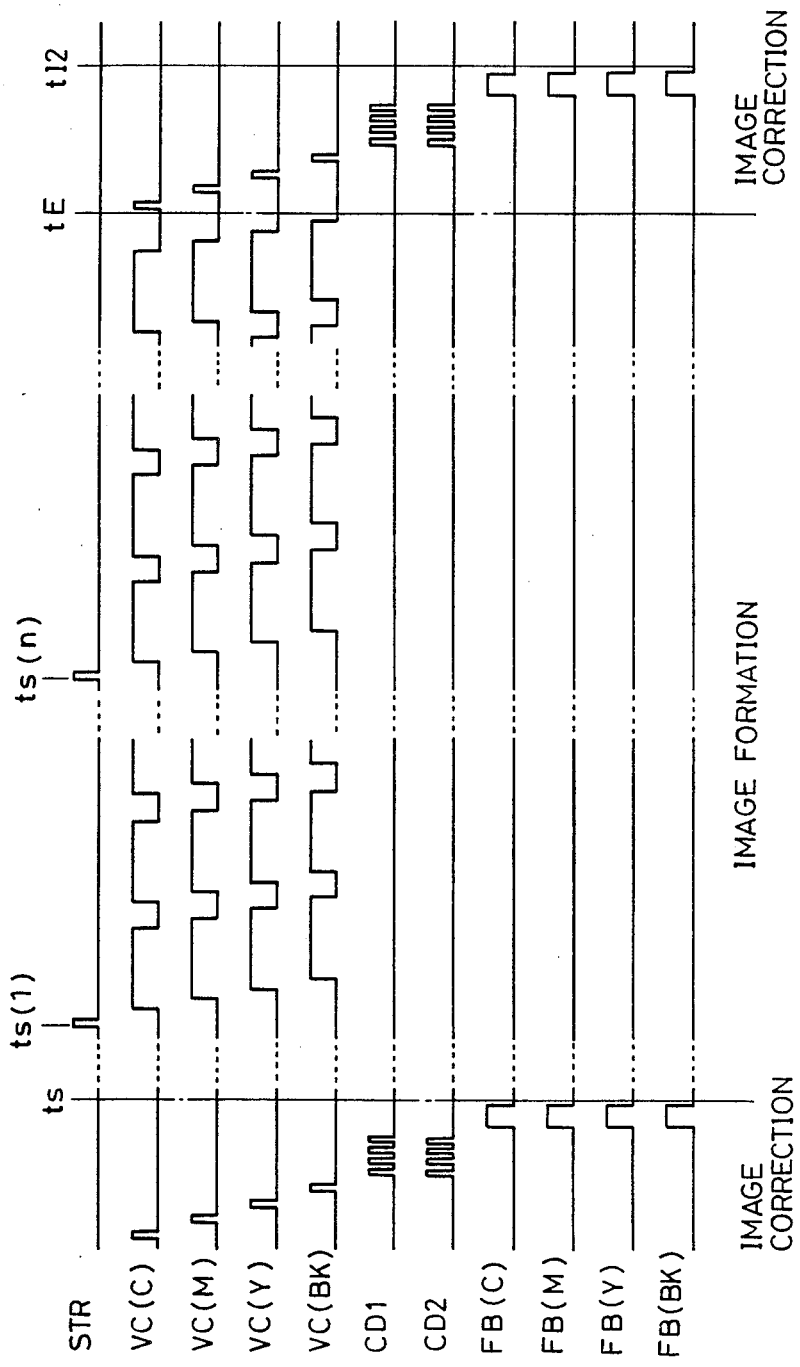

FIG. 10 is a timing chart illustrative of a third correction control process which can be employed in the described embodiment. In this Figure, the same reference numerals are used to denote the same things as those in FIG. 6.

As will be seen from this Figure, the image misregistration correction is completed at an instant $t_s$ and the apparatus waits for the input of the next print start signal STR. When the print start signal STR rises at an instant $t_{s(1)}$, the apparatus starts the image forming sequence to produce a registered number of copies. Then, the apparatus again waits for the next print start signal STR. This sequence is repeated each time the print start signal STR rises.

In this third correction control process, operation for correcting image misregistration is executed each time a predetermined total number of copies has been produced. However, if the registered number of copies for a particular original has not been produced yet when the total number of copies produced by the apparatus has reached the predetermined number, the copying operation is continued until the registered number of copies is obtained with the present original image, and the time misregistration correction is executed only after the registered number of copies has been obtained.

Referring to FIG. 10, it is assumed that an image forming sequence is started in response to a print start signal STR at an instant $t_s(n)$. On the other hand, the number of copies produced after the last misregistration correcting operation conducted at instant $t_S$ is counted. When the counted value, i.e., the total number of copies produced since the last misregistration correcting operation has exceeded a predetermined number which maybe variable and which is stored in a memory during the present image forming operation, image misregistration correcting operation is executed at an instant tE at which the image forming operation triggered by the start signal STR issued at the instant $t_{S(n)}$ is completed. The total number of copies produced since the last misregistration correction is counted by the counter circuit 15e shown in FIG. 4 and is compared by the CPU 15a with the value stored in the RAM 15c.

Figure 11:
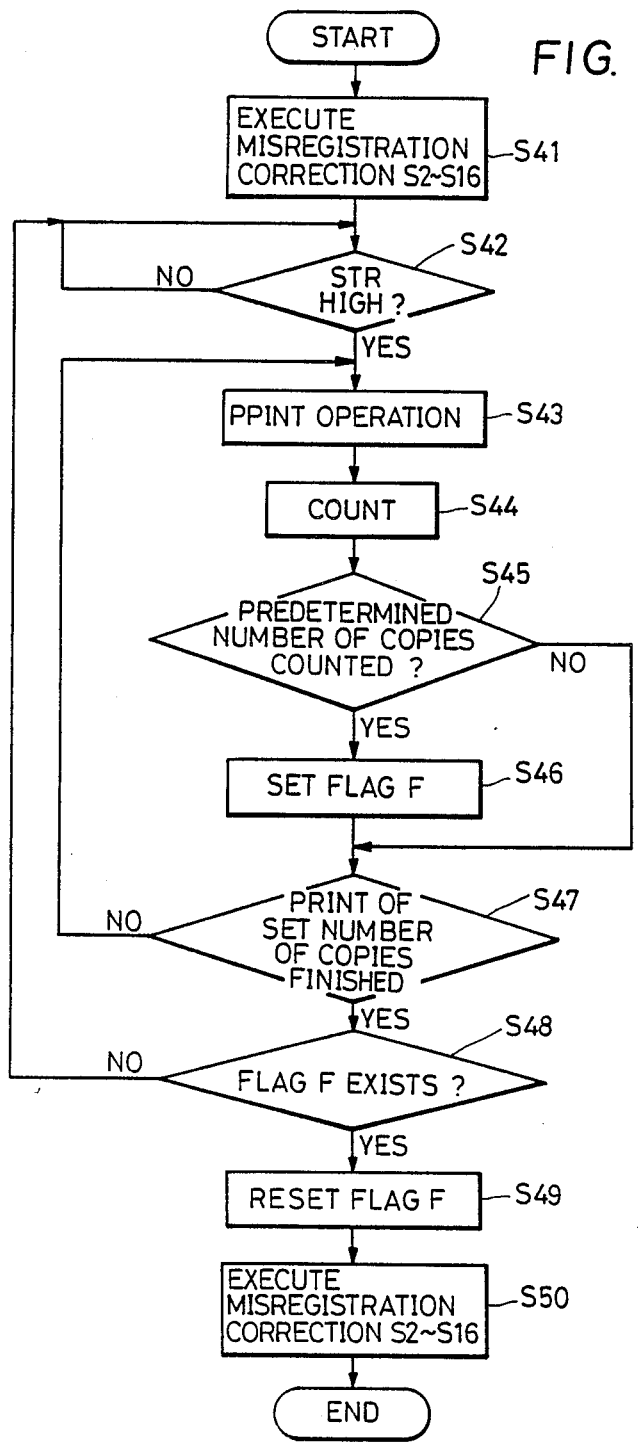

The third correction control process will be explained with reference to a flow chart shown in FIG. 11.

In Step S41, the predetermined number of copies has been produced so that the misregistration correction is executed. The operation executed in Step S41 is the same as those executed in Steps S2 to S16 in the flow of FIG. 7 and Steps S22 to S36 of the flow shown in FIG. 9.

This Step S41 also clears the counter 15e. Step judges whether the signal STR has been set high (H), i.e., whether the start key 34 has been pressed. Upon judging that the start signal STR has been set high, the process proceeds to Step S43 in which the printing operation is executed. In Step S44, the content of the counter circuit 15e is incremented by one in response to production of each copy. Step S45 judges whether the value counted in the counter circuit 15e has reached the predetermined number.i.e., the total copy number which necessitates the image misregistration correction. When the predetermined number has been reached, a flag F is set in the RAM 15c in Step S46. If the judgment in Step S45 has proved that the count value has not reached yet the predetermined number, the process proceeds to Step S47 without setting the flag F. Step S47 judges whether the number of copies which has been registered prior to the operation of the start key in Step S42 has been reached, i.e., whether the registered number of copies of a particular original has been finished.

If the registered number of copies has not been finished yet, the process returns to Step S43 in which the copying operation is continued. Conversely, if copies of the registered number have been obtained, the process proceeds to Step S48 which judges whether the flag F has been set or not. If the flag F has not been set yet, the controller decides that the misregistration correction need not be executed at this instant, and returns the process to Step S42 so that the image forming apparatus waits for the next input of the start signal STR through the start key 34. Conversely, if the flag F has been set, the flag F is reset in Step S49 and operation for correcting image misregistration is executed in Step S50.

As will be understood from the foregoing description, in the third correction control process, the total number of copies produce since the last misregistration correcting operation is counted and the next misregistration correction is executed when the apparatus is in the waiting condition after the predetermined number of copies has been obtained. It is therefore possible to effect misregistration correction even when the image forming apparatus is required to operate continuously to produce a large number of copies. In consequence, clear copy image can stably be obtained without causing the rate of operation to decrease, even when the apparatus is used frequently. As has been described, the image forming apparatus of the present invention has misregistration correction means which is capable of effecting correction of misregistration detected by detecting means for each image forming station, at a timing which is independent from the image forming sequence performed in each image forming station. The misregistration correction operation, therefore, is not executed when the image forming sequence is being executed in any of the image forming station, and the image forming sequence can be started always in a state in which the causes of image misregistration have been eliminated. It is therefore possible to obtain clear color copy images with good balance and hue. In addition, since the misregistration correction is executed in a predetermined period prior to the start of ordinary image forming sequence or in a period in which the image forming apparatus is in the waiting condition, necessary image forming operations can be performed without being interrupted by the misregistration correcting operation, thus ensuring a high rate of use of the image producing apparatus.

Although the invention has been described through its specific terms, it is to be understood that the described embodiments are only illustrative and various changes and modifications are possible without departing from the scope of the invention which is limited solely by the appended claims.

What is claimed is:

1. An image forming apparatus comprising:
   image forming means for forming an image on a transfer material in accordance with image signals, and for forming a register mark indicative of an image forming position;
   detection means for detecting said register mark and for determining image misregistration in accordance with said register mark;
   correction means for correcting, in accordance with said detection means, a misregistration of the image forming position; and
   control means for controlling said correction means such that said correction means operates independently of an image forming operation performed by said image forming means.

2. An image forming apparatus according to claim 1, wherein said image forming means forms an image on said transfer material by an electrophotographic process.

3. An image forming apparatus according to claim 1, wherein said correction means includes first correction means for correcting image misregistration in a main scanning direction of said image forming means, said first correction means operating in accordance with the result of detection by said detection means.

4. An image forming apparatus according to claim 1, wherein said correction means includes second correction means for correcting image misregistration in a sub-scanning direction of said image forming means, said second correction means operating in accordance with the result of detection by said detection means.

5. An image forming apparatus according to claim 1, wherein said control means controls said correction means to effect the correction of image misregistration in a period commencing when power is supplied to said apparatus and terminating when warm-up of said apparatus is completed.

6. An image forming apparatus according to claim 1, wherein said control means controls said correction means to effect the correction of image misregistration in response to a signal for starting the image forming operation of said image forming means.

7. An image forming apparatus according to claim 1, further comprising conveyor means for conveying said transfer material, and wherein said image forming means includes means for forming different images on a plurality of image carriers, and image transfer means for transferring said different images on said image carriers to the same transfer material which is being conveyed by said conveyor means.

8. An image forming apparatus according to claim 2, wherein said register marks are formed on said conveyor means by said image forming means.

9. An image forming apparatus according to claim 7, wherein said conveyor means includes a belt for conveying said transfer material and said marks are formed on said belt by said image forming means.

10. An image forming apparatus according to claim 1, further comprising counting means for counting the number of images produced by said image forming means, and said control means controls said correction means to effect the correction of image misregistration when said counter means has counted to a predetermined number.

11. An image forming apparatus according to claim 10, wherein when said counting means has counted to said predetermined number, said control means postpones correction of image misregistration until an image forming operation of said image forming means has been completed.

12. An image forming apparatus comprising:
a plurality of image forming stations each for forming an image on a transfer material, and each having an image carrier and image forming means arranged around said image carrier, each of said image forming means forming a register mark on its associated image carrier;
conveyor means for conveying the transfer material, each of said image forming stations transferring an associated register mark onto said conveyor means;
detection means for detecting the register marks corresponding to the associated image carriers;
misregistration calculating means for calculating misregistration information corresponding to misregistration of an image forming position of said image forming stations based on the detection of the register marks by said detection means; and
correction means for correcting image misregistration in accordance with the misregistration information from said misregistration calculating means such that said correction means operates independently of an image forming sequence in all of said image forming stations.

13. An image forming apparatus according to claim 12, wherein in a accordance with the image misregistration information, said correction means corrects misregistration in a main scanning direction of each image forming station.

14. An image forming apparatus according to claim 12, wherein in accordance with the image misregistration information said correction means corrects misregistration in a sub-scanning direction of each image forming station.

15. An image forming apparatus according to claim 12, wherein said correction means completes the correction of image misregistration in accordance with the image misregistration information for all the image forming stations in a period commencing when power is supplied to said apparatus and terminating when warm-up of said apparatus is completed.

16. An image forming apparatus according to claim 12, wherein said correction means completes the correction of image misregistration in accordance with the image misregistration information for all the image forming stations before the image forming sequence is commenced.

17. An image forming apparatus according to claim 12, wherein said image forming means forms images by an electrophotographic process in accordance with image signals.

18. An image forming apparatus according to claim 12, wherein said correction means completes the correction of image misregistration in accordance with the image misregistration information for all the image forming stations each time a predetermined number of consecutive images has been formed by said image forming apparatus.

19. An image forming apparatus according to claim 18, wherein said correction means postpones correction of image misregistration until image forming operations of said image forming stations have been completed.

20. An image forming apparatus comprising:
image forming means for forming an image in accordance with image signals;
correction means for correcting misregistration of an image formed by said image forming means;
counter means for counting the number of images formed by said image forming means; and
control means for controlling the operation of said correction means in accordance with the value counted by said counter means.

21. An image forming apparatus according to claim 20, wherein said image forming means includes a plurality of image forming stations for forming different images, and said correction means is designed for effecting correction of misregistration between the different images formed by different image forming stations.

22. An image forming apparatus according to claim 20, wherein said control means is designed for controlling said correction means such that said correction means executes the correction of image misregistration after completion of an image forming sequence when said counting means has counted said predetermined number during execution of said image forming sequence.

23. An image forming apparatus according to claim 20, wherein said image forming means includes image writing means for writing different images on a plurality of image carriers, conveyor means for conveying a transfer material, and image transfer means for transferring said different images from said image carriers to said transfer material.

24. An image forming apparatus according to claim 23, wherein said correction means includes register mark forming means for enabling said image forming means to form register marks on said transfer material, and detection means for detecting said register marks, whereby the correction of image misregistration is conducted in accordance with the detection performed by said detection means.

25. An image forming apparatus having a warm-up period commencing after application of power, said image forming apparatus comprising:
   image forming means for forming an image in accordance with image signals;
   correction means for correcting misregistration of an image formed by said image forming means; and
   control means for controlling said correction means such that correction of image misregistration is executed in the warm-up period.

26. An image forming apparatus according to claim 25, wherein said image forming means includes image writing means for writing different images on a plurality of image carriers, conveyor means for conveying a transfer material, and image transfer means for transferring said different images from said image carriers to said transfer material.

27. An image forming apparatus according to claim 25, wherein said image forming means includes a plurality of image forming stations for forming different images, and said correction means is designed for effecting correction of misregistration between the different images formed by different image forming stations.

28. An image forming apparatus according to claim 25, wherein said correction means includes register mark forming means for enabling said image forming means to form register marks on said transfer material, and detection means for detecting said register marks, whereby the correction of image misregistration is conducted in accordance with the detection performed by said detection means.

29. An image forming apparatus according to claim 28, wherein said control means controls the operation of said correction means such that the correction of image misregistration is commenced during the warm-up period and produces a warm-up completion signal after the correcting operation of said correction means is completed.

30. An image forming apparatus comprising:
   image forming means for forming an image in accordance with image signals;
   input means for instructing commencement of an image forming operation;
   correction means for correcting misregistration of an image formed by said image forming means; and
   control means for controlling said correction means such that correction means conducts the correction of image misregistration in response to said input means.

31. An image forming apparatus according to claim 30, wherein said image forming means includes a plurality of image forming stations for forming different images, and said correction means is designed for effecting correction of misregistration between the different images formed by different image forming stations.

32. An image forming apparatus according to claim 30, wherein said image forming means includes image writing means for writing different images on a plurality of image carriers, conveyor means for conveying a transfer material, and image transfer means for transferring said different images from said image carriers to said transfer material.

33. An image forming apparatus according to claim 32, wherein said correction means includes register mark forming means for enabling said image forming means to form register marks on said transfer material, and detection means for detecting said register marks, whereby the correction of image misregistration is conducted in accordance with the detection performed by said detection means.

34. An image forming apparatus comprising:
   image forming means for forming an image on a transfer material in accordance with image signals, and for forming a register mark indicative of an image forming position;
   conveyor means for conveying said transfer material, wherein said register mark is formed on said conveyor means by said image;
   detection means for detecting said register mark and for determining image misregistration in accordance with said register mark;
   correction means for correcting, in accordance with said detection means, a misregistration of the image forming position; and
   control means for controlling said correction means such that said correction means operates independently of an image forming operation performed by said image forming means.

* * * * *